(12) United States Patent
Giusti et al.

(10) Patent No.: US 8,137,073 B2
(45) Date of Patent: Mar. 20, 2012

(54) COMPOSITE TURBOMACHINE BLADE WITH METAL REINFORCEMENT

(75) Inventors: Stephane Rene Julien Giusti, La Chapelle Gauthier (FR); Christophe Jacq, Courpalay (FR); Jean-Pierre Francois Lombard, Pamfou (FR); Arnaud Rene Suffis, Brunoy (FR)

(73) Assignee: SNECMA, Paris (FR)

( * ) Notice: Subject to any disclaimer, the term of this patent is extended or adjusted under 35 U.S.C. 154(b) by 1219 days.

(21) Appl. No.: 11/856,357

(22) Filed: Sep. 17, 2007

(65) Prior Publication Data

US 2008/0075601 A1     Mar. 27, 2008

(30) Foreign Application Priority Data

Sep. 26, 2006   (FR) .................................... 06 53937

(51) Int. Cl.
*F04D 29/38*    (2006.01)
(52) U.S. Cl. ...................................... 416/224
(58) Field of Classification Search .............. 416/2, 224, 416/230
See application file for complete search history.

(56) References Cited

U.S. PATENT DOCUMENTS

| | | | |
|---|---|---|---|
| 3,628,890 A | | 12/1971 | Sayre et al. |
| 3,758,234 A | * | 9/1973 | Goodwin ........................ 416/230 |
| 4,006,999 A | | 2/1977 | Brantley et al. |
| 4,944,655 A | * | 7/1990 | Merz ................................. 416/61 |
| 5,375,978 A | | 12/1994 | Evans et al. |
| 5,480,284 A | * | 1/1996 | Wadia et al. ..................... 416/91 |
| 5,725,354 A | * | 3/1998 | Wadia et al. ................... 416/224 |
| 5,908,285 A | * | 6/1999 | Graff ............................. 416/224 |

FOREIGN PATENT DOCUMENTS

| | | |
|---|---|---|
| DE | 44 11 679 C1 | 12/1994 |
| DE | 197 51 129 C1 | 6/1999 |
| EP | 0 496 550 A1 | 7/1992 |
| FR | 2 732 406 A1 | 10/1996 |
| GB | 1 500 776 | 2/1978 |

* cited by examiner

*Primary Examiner* — Nathaniel Wiehe
(74) *Attorney, Agent, or Firm* — Oblon, Spivak, McClelland, Maier & Neustadt, L.L.P.

(57) ABSTRACT

The invention relates to a turbomachine blade comprising an aerodynamic surface made of a composite material and extending in a first direction between a leading edge and a trailing edge, and in a second direction between a root and a tip of the blade. The blade includes solid metal reinforcement that is adhesively bonded to the leading edge of its aerodynamic surface, which reinforcement extends along the first direction beyond the leading edge of the aerodynamic surface and along the second direction between the root and the tip, and includes at least one recess for absorbing at least a portion of the energy that results from an impact of a foreign body against the leading edge of the blade.

20 Claims, 2 Drawing Sheets

COMPOSITE TURBOMACHINE BLADE WITH METAL REINFORCEMENT

BACKGROUND OF THE INVENTION

The present invention relates to the general field of turbomachine blades. It relates more particularly to a turbomachine fan blade made of composite material and having its leading edge fitted with structural reinforcement made of metal.

It is known to fit the fan blades of a turbomachine that are made of composite material with structural reinforcement made of metal that extends over the full height of the blade and beyond its leading edge. Such reinforcement serves to protect the set of composite blades in the event of a foreign body impacting the fan, such as a bird being ingested by the turbomachine, for example.

In particular, the metal reinforcement protects the leading edge of the composite material blade by preventing delamination if the blade is a draped blade, and damage by fiber/matrix decohesion or by fiber rupture if the blade is a woven blade.

Nevertheless, the presence of structural reinforcement made of metal covering the leading edge of the blade is not always effective in protecting the set of composite blades in the event of an impact from a foreign body.

OBJECT AND SUMMARY OF THE INVENTION

A main aim of the present invention is thus to mitigate such a drawback by proposing a composite blade capable of withstanding the impact from a foreign body without leading to degradation of the set of composite blades.

This object is achieved by a turbomachine blade comprising an aerodynamic surface extending along a first direction between a leading edge and a trailing edge, and along a second direction substantially perpendicular to the first direction between a root and a tip of the blade, said aerodynamic surface being made of a composite material, and in which, in accordance with the invention, the blade includes solid metal reinforcement adhesively bonded to the leading edge of its aerodynamic surface, the reinforcement extending along the first direction beyond the leading edge of the aerodynamic surface of the blade and in the second direction between the root and the tip of the blade, and including at least one recess for absorbing at least a portion of the energy that results from the impact of a foreign body against the leading edge of the blade.

The presence of at least one recess in the solid metal reinforcement enables it to absorb a portion of the energy that results from the impact of a foreign body against the blade. This impact energy is dissipated by plastic deformation of the metal reinforcement. As a result, the impact of a foreign body on the blade does not lead to major degradation of the set of composite blades.

In an embodiment of the invention, the recess extends substantially in the first direction. The recess can then open out at the leading edge of the aerodynamic surface of the blade and/or in the leading edge of the metal reinforcement.

In a another embodiment, the recess extends substantially in the second direction. The recess may then open out in the vicinity of the root of the blade and/or in the vicinity of the tip of the blade.

In yet another embodiment, the recess extends substantially in a third direction perpendicular to the first direction and second directions. The recess may then open out in the pressure side of the blade and/or the suction side of the blade.

The solid metal reinforcement may be made on the basis of titanium. The blade may constitute a turbomachine fan blade.

The invention also provides a turbomachine including at least one blade as defined above.

BRIEF DESCRIPTION OF THE DRAWINGS

Other characteristics and advantages of the present invention appear from the following description made with reference to the accompanying drawings that show an embodiment that has no limiting character. In the figures.

DETAILED DESCRIPTION OF EMBODIMENTS

Figure 1:
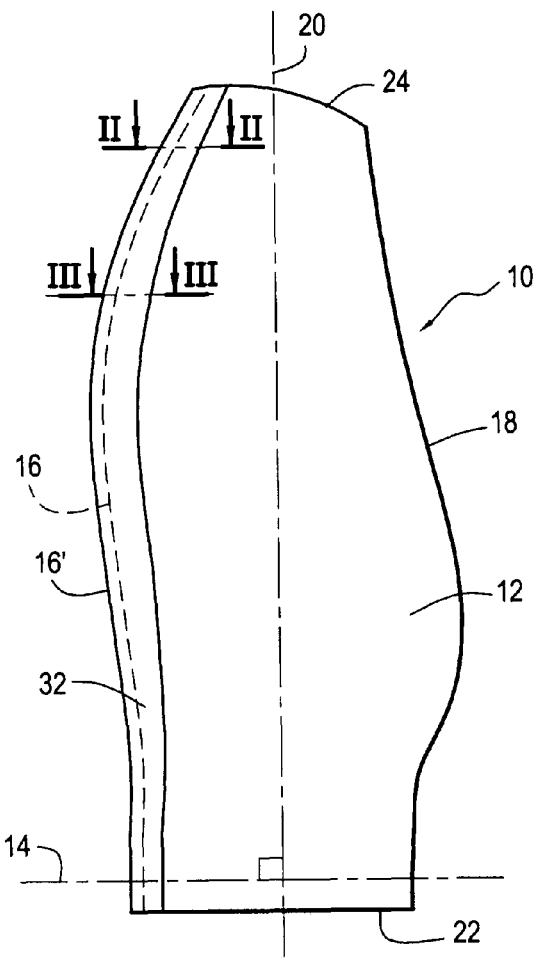
FIG. 1 is a longitudinal section view of a blade of the invention.
Figure 2:
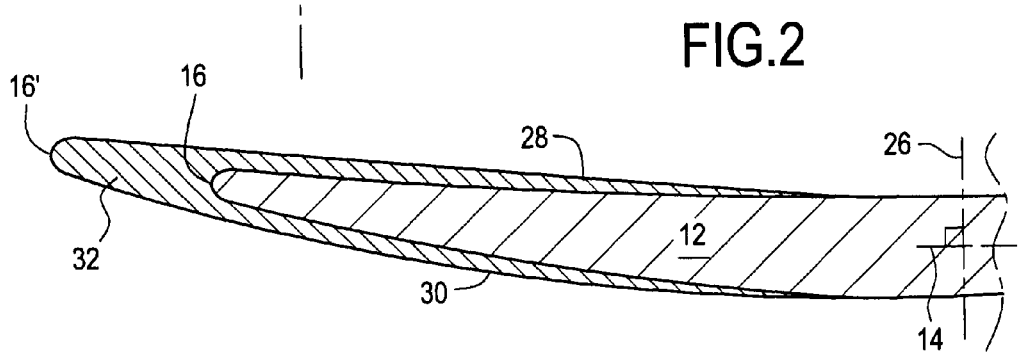
FIGS. 2 and 3 are fragmentary section views of FIG. 1 respectively on II-II and on III-III.
Figure 3:
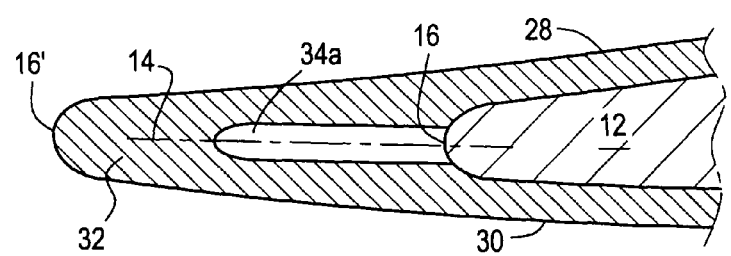

FIGS. 1 to 3 show a turbomachine blade 10 constituting an embodiment of the invention. By way of example, the blade is a moving blade of a turbomachine fan.

The blade presents an aerodynamic surface 12 extending in an axial first direction 14 between a leading edge 16 and a trailing edge 18, and in a radial second direction 20 that is substantially perpendicular to the first direction 14 between a root 22 and a tip 24. As shown in FIG. 2, which shows a portion of the blade in cross-section, the blade also extends in a tangential third direction 26 perpendicular to the first and second directions between a pressure side 28 and a suction side 30. The pressure side and the suction side of the blade form its side faces interconnecting the leading edge 16 and the trailing edge 18 of the blade.

The blade, and more particularly its aerodynamic surface 12 as defined above, is obtained by draping or weaving a composite material. By way of example, the composite material may be an assembly of carbon fibers that have been woven and molded by a vacuum injection method known as resin transfer molding (RTM).

The aerodynamic surface 12 of the blade of the invention includes metal structural reinforcement 32 that is adhesively bonded to its leading edge 16 and that extends both in the first direction 14 beyond the leading edge 16 of the aerodynamic surface of the blade, and in the second direction 20 between the root 22 and the tip 24 of the blade.

As shown in FIGS. 2 and 3, the structural reinforcement 32 fits closely to the shape of the leading edge 16 of the aerodynamic surface, that it extends so as to form a leading edge 16' referred to herein as the leading edge of the reinforcement. By way of example, the distance between the leading edges 16 and 16' as measured in the first direction 14 may be about 3 centimeters (cm) to 4 cm for a blade in which the distance between the leading edge 16 and the trailing edge 18 can be as great as 50 cm (thus representing 6% to 8% of said distance).

In addition, the structural reinforcement 32 extends in the first direction 14 beyond the leading edge 16 of the aerodynamic surface to fit closely to the profiles of the pressure side 28 and the suction side 30 of the blade.

The structural reinforcement 32 of the invention is solid (in a single piece), i.e. the reinforcement is full of material both in cross-section and in longitudinal section. For example, as shown in FIG. 2, in cross-section there is no discontinuity between the leading edges 16 and 16'.

The structural reinforcement 32 of the blade is made of metal, and is preferably based on titanium. This material presents high capacity for absorbing energy due to impacts. The reinforcement is adhesively bonded to the blade, with the adhesive used possibly being a cyanoacrylate or an epoxy adhesive.

Still according to the invention, the metal reinforcement 32 of the blade includes at least one recess for absorbing at least a portion of the energy that results from the impact of a foreign body against the leading edge of the blade.

The number, shape, location, and orientation of the recess(es) in the metal reinforcement of the blade can vary as a function of the application. These parameters are determined and optimized as a function of the most critical impact that might be encountered.

There follows a description of various preferred shapes for recesses in the metal reinforcement of the blade of the invention.

Figure 4:
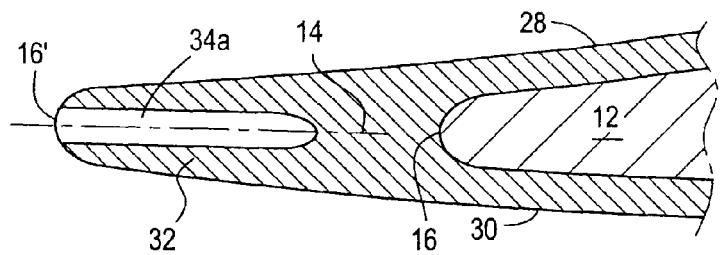
FIGS. 4 and 5 are fragmentary cross-section views showing a variant embodiment of the FIG. 1 blade.
Figure 5:
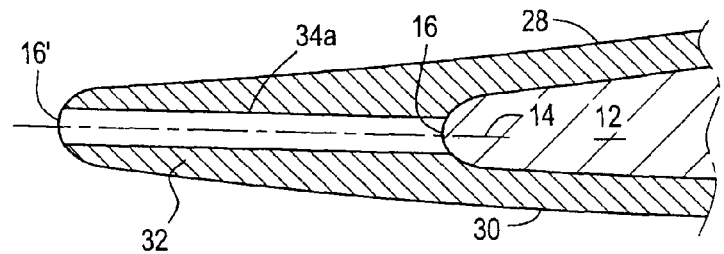

In the embodiment of FIGS. 3, 4, and 5, the recess in the reinforcement 32 is in the form of a hollow cavity 34a extending along the first direction 14 of the blade.

More precisely, in the variant embodiment shown in FIG. 3, the recess is a hollow cavity 34a that opens out at the leading edge 16 of the aerodynamic surface 12 of the blade.

In the variant of FIG. 4, the recess is a hollow cavity 34a that opens into the leading edge 16' of the metal reinforcement 32.

The recess 34a in FIG. 5 opens out both at the leading edge 16 of the aerodynamic surface 12 and into the leading edge 16' of the metal reinforcement 32.

Figure 6:
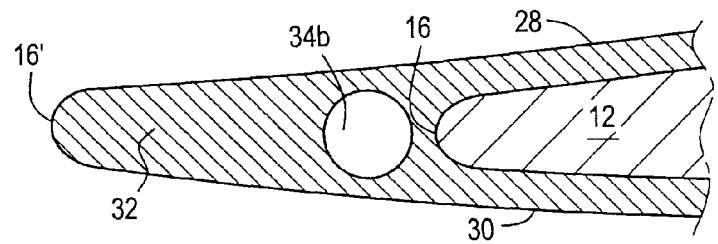
FIGS. 6 and 7 are fragmentary cross-section views of a blade constituting another embodiment of the invention.
Figure 7:
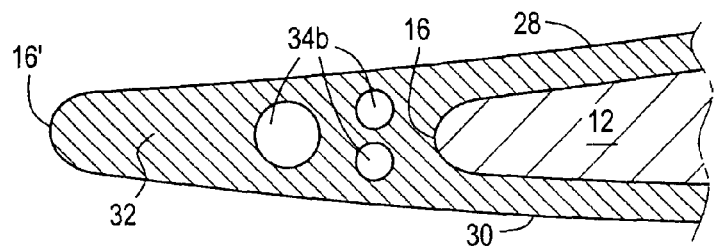

In the embodiment of FIGS. 6 and 7, the recess in the reinforcement 32 is in the form of a hollow cavity 34b that extends in the second direction 20 of the blade.

This hollow cavity 34b may open out in the vicinity of the root 22 and/or the tip 24 of the blade. For a hollow cavity that opens out both in the vicinity of the root and in the vicinity of the tip of the blade, a flow of air may travel through the blade, thereby contributing to improving the aerodynamic performance of the turbomachine.

In addition, as shown in FIG. 6, the recess in the metal reinforcement may be formed by a single hollow cavity 34b of substantially circular section. Alternatively, as shown in FIG. 7, the recess may be made up of a plurality of cavities (there being three in the example shown).

Naturally, a section of any other shape is possible (oval, polygonal, etc.). Furthermore, the dimensions of the cavity(ies) may vary over the full height of the blade so as to be adapted to the pair comprising the mass of a foreign body impacting the blade and height along the blade.

Figure 8:
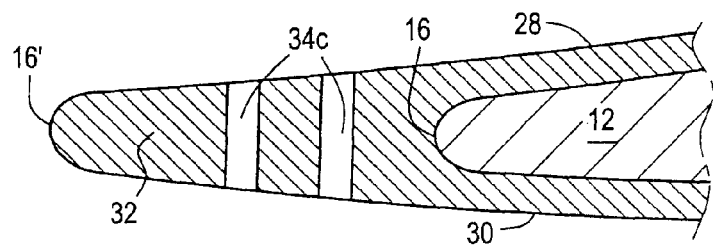
FIGS. 8 and 9 are fragmentary cross-section views of a blade constituting yet another embodiment of the invention.
Figure 9:
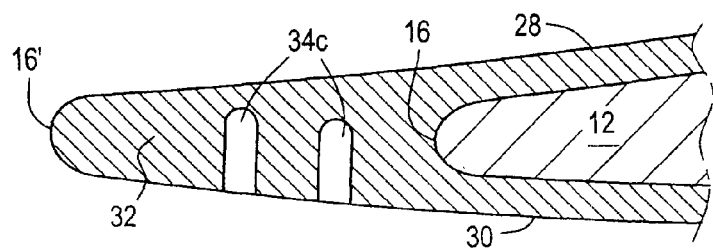

In the embodiment of FIGS. 8 and 9, the recesses in the reinforcement 32 are in the form of hollow cavities 34c extending along the third direction 26 of the blade.

More precisely, in the variant embodiment of FIG. 8, two recesses are provided, each having a hollow cavity 34c that opens out both into the pressure side 28 of the blade and into the suction side 30 of the blade. Thus, the recesses serve to convey a flow of air between the pressure and suction sides, which contributes to improving the aerodynamic performance of the turbomachine.

In the variant embodiment shown in FIG. 9, two recesses are provided, each constituted by a hollow cavity 34c that opens out solely in the suction side 30 of the blade.

In the embodiments of FIGS. 3, 4, 5, 6, 7, 8, and 9, the recesses are implemented in the form of cavities 34a to 34c that are hollow. Nevertheless, it is possible to imagine these cavities being filled with a non-structural material (i.e. a material having no stiffness) so as to reconstitute the surface of the profile. By way of example, such a non-structural material may be of the polymer, rubber, or silicone type.

What is claimed is:

1. A turbomachine blade comprising:
an aerodynamic surface extending along a first direction between a leading edge and a trailing edge, and extending along a second direction substantially perpendicular to the first direction between a root and a tip of the blade, said aerodynamic surface being made of a composite material; and
a solid metal reinforcement adhesively bonded to the leading edge of the aerodynamic surface, wherein:
the solid metal reinforcement extends along the first direction beyond the leading edge of the aerodynamic surface of the blade and extends in the second direction between the root and the tip of the blade,
the solid metal reinforcement includes at least one recess for absorbing at least a portion of an energy that results from an impact of a foreign body against the leading edge of the blade,
the at least one recess extends substantially along a third direction perpendicular to both the first direction and the second direction, and
the at least one recess opens out to both an aperture through the pressure side of the blade and an aperture through the suction side of the blade.

2. The turbomachine blade according to claim 1, in which the solid metal reinforcement is made of titanium.

3. The turbomachine blade according to claim 1, constituting a blade of a turbomachine fan.

4. A turbomachine including at least one turbomachine blade according to claim 1.

5. The turbomachine blade according to claim 1, wherein a distance from a leading edge of the solid metal reinforcement to the leading edge of the aerodynamic surface of the blade is not less than about 1.2 inches (3 centimeters) and not greater than about 1.6 inches (4 centimeters).

6. The turbomachine blade according to claim 1, wherein a first distance from a leading edge of the solid metal reinforcement to the leading edge of the aerodynamic surface of the blade is in the range of about 6% to about 8% of a second distance from the leading edge of the solid metal reinforcement to the trailing edge of the blade.

7. The turbomachine blade according to claim 1, wherein the at least one recess is not in fluid communication with an aperture on the leading edge of the blade, an aperture on the root of the blade, or an aperture on the tip of the blade.

8. The turbomachine blade according to claim 1, wherein the at least one recess is substantially filled with a nonstructural material.

9. The turbomachine blade according to claim 8, wherein the nonstructural material is a material selected from the group consisting of a polymer, rubber, and silicone.

10. A turbomachine blade comprising:
an aerodynamic surface extending along a first direction between a leading edge and a trailing edge, and extending along a second direction substantially perpendicular to the first direction between a root and a tip of the blade, said aerodynamic surface being made of a composite material; and
a solid metal reinforcement adhesively bonded to the leading edge of the aerodynamic surface, wherein:
the solid metal reinforcement extends along the first direction beyond the leading edge of the aerodynamic surface of the blade and extends in the second direction between the root and the tip of the blade, the solid metal reinforcement includes at least one recess for absorbing at least a portion of an energy that results from an impact of a foreign body against the leading edge of the blade, the at least one recess extends substantially along a third direction, perpendicular to both the first direction and the second direction, a first end of the at least one recess opens out to an aperture through a suction side of the blade, a second end of the least one recess, opposite the first end of the at least one recess, terminates within the solid metal reinforcement, and the at least one recess is not in fluid communication with an aperture on the pressure side of the blade, an aperture on the leading edge of the blade, an aperture on the root of the blade, or an aperture on the tip of the blade.

11. The turbomachine blade according to claim 10, in which the solid metal reinforcement is made of titanium.

12. The turbomachine blade according to claim 10, wherein a distance from a leading edge of the solid metal reinforcement to the leading edge of the aerodynamic surface of the blade is not less than about 1.2 inches (3 centimeters) and not greater than about 1.6 inches (4 centimeters).

13. The turbomachine blade according to claim 10, wherein a first distance from a leading edge of the solid metal reinforcement to the leading edge of the aerodynamic surface of the blade is in the range of about 6% to about 8% of a second distance from the leading edge of the solid metal reinforcement to the trailing edge of the blade.

14. The turbomachine blade according to claim 10, wherein the at least one recess is substantially filled with a nonstructural material.

15. The turbomachine blade according to claim 14, wherein the nonstructural material is a material selected from the group consisting of a polymer, rubber, and silicone.

16. A turbomachine blade comprising:

an aerodynamic surface extending along a first direction between a leading edge and a trailing edge, and extending along a second direction substantially perpendicular to the first direction between a root and a tip of the blade, said aerodynamic surface being made of a composite material; and a solid metal reinforcement adhesively bonded to the leading edge of the aerodynamic surface, wherein:

the solid metal reinforcement extends along the first direction beyond the leading edge of the aerodynamic surface of the blade and extends in the second direction between the root and the tip of the blade, the solid metal reinforcement includes at least one recess for absorbing at least a portion of an energy that results from an impact of a foreign body against the leading edge of the blade, the at least one recess extends substantially along the first direction, a first end of the at least one recess opens out to an aperture through the leading edge of the blade, a second end of the least one recess, opposite the first end of the at least one recess, terminates within the solid metal reinforcement, and the at least one recess is not in fluid communication with an aperture on the suction side of the blade, an aperture on the pressure side of the blade, an aperture on the root of the blade, or an aperture on the tip of the blade.

17. The turbomachine blade according to claim 16, in which the solid metal reinforcement is made of titanium.

18. The turbomachine blade according to claim 16, wherein a distance from a leading edge of the solid metal reinforcement to the leading edge of the aerodynamic surface of the blade is not less than about 1.2 inches (3 centimeters) and not greater than about 1.6 inches (4 centimeters).

19. The turbomachine blade according to claim 16, wherein a first distance from a leading edge of the solid metal reinforcement to the leading edge of the aerodynamic surface of the blade is in the range of about 6% to about 8% of a second distance from the leading edge of the solid metal reinforcement to the trailing edge of the blade.

20. The turbomachine blade according to claim 16, wherein the at least one recess is substantially filled with a nonstructural material.

* * * * *